United States Patent

Kremp et al.

[15] 3,677,147
[45] July 18, 1972

[54] PHOTOGRAPHIC APPARATUS FOR MAKING EXPOSURES IN ACCORDANCE WITH THE CARRIER FREQUENCY METHOD

[72] Inventors: Rudolf Kremp, Gruenwald; Alfred Winkler, Munich, both of Germany

[73] Assignee: Agfa-Gevaert Aktiengesellschaft, Leverkusen, Germany

[22] Filed: Dec. 21, 1970

[21] Appl. No.: 99,773

[30] Foreign Application Priority Data

Dec. 22, 1969 Germany......................P 19 64 230.9

[52] U.S. Cl....................................95/1 R, 95/11 R, 95/36, 95/37, 95/38, 95/66, 350/162 SF
[51] Int. Cl..............G03b 19/02, G03b 11/00, G03b 17/36
[58] Field of Search................95/1 R, 36 R, 37, 38, 66, 11 R, 95/12.2; 350/162 SF

[56] References Cited

UNITED STATES PATENTS

| 2,787,942 | 4/1957 | Edwards | 95/37 |
| 3,282,186 | 11/1966 | Niccolls | 95/38 |
| 3,324,764 | 6/1967 | Altman | 355/40 |
| 3,408,143 | 10/1968 | Mueller | 355/40 |
| 3,425,770 | 2/1969 | Mueller et al. | 350/162 SF |
| 3,574,616 | 4/1971 | Mueller | 350/162 SF |

FOREIGN PATENTS OR APPLICATIONS 28,863  12/1904  Great Britain.............................95/66

*Primary Examiner*—Samuel S. Matthews
*Assistant Examiner*—Robert P. Greiner
*Attorney*—Michael S. Striker

[57] ABSTRACT

A photographic camera for repeatedly exposing a single film through a grating in accordance with the carrier frequency method has a release element which indexes the grating with reference to the film prior to opening of the shutter. The film is pressed against the grating while the shutter is open and the cassette for film has a shade which overlies the film before the cassette can be removed from the housing of the camera.

19 Claims, 7 Drawing Figures

PATENTED JUL 18 1972  SHEET 1 OF 3  3,677,147

INVENTOR
RUDOLF KREMP
ALFRED WINKLER

BY
*[signature]*
Attorney

INVENTOR
RUDOLF KREMP
ALFRED WINKLER

PHOTOGRAPHIC APPARATUS FOR MAKING EXPOSURES IN ACCORDANCE WITH THE CARRIER FREQUENCY METHOD

CROSS-REFERENCE TO RELATED APPLICATION

The photographic apparatus of the present invention constitutes an improvement over and a further development of apparatus disclosed in the copending application Ser. No. 803,676 filed Mar. 3, 1969 by Bestenreiner et al., and owned by the assignee of the present application.

BACKGROUND OF THE INVENTION

The present invention relates to photographic apparatus in general, and more particularly to improvements in photographic cameras for repeatedly exposing a single photostorage medium in accordance with the carrier frequency method as disclosed in the copending application Ser. No. 803,676 of Bestenreiner et al. Such method involves the utilization of a grating which is imaged onto the photostorage medium whereby the position of the grating with reference to the medium changes prior to each exposure. The reproduction of images from the repeatedly exposed photostorage medium is carried out by resorting to the diffraction orders of the grating.

A drawback of presently known photographic apparatus for making exposures in accordance with the carrier frequency method is that they are not suited for mass production. Known apparatus are still in an experimental stage and cannot be used by amateurs who may or may not be familiar with the principles of carrier frequency photography. Furthermore, proper positioning of the grating with reference to the photostorage medium or vice versa presents serious problems even in those known apparatus which are designed for experimental use in research laboratories or the like.

SUMMARY OF THE INVENTION

An object of the invention is to provide a novel and improved photographic apparatus for repeated exposure of a single photostorage medium in accordance with the carrier frequency method.

Another object of the invention is to provide a compact photographic camera for making a large number of exposures on a single sheet of photographic film.

A further object of the invention is to provide a novel container or cassette for a photostorage medium which can be utilized in the improved camera.

An additional object of the invention is to provide a photographic camera for making exposures in accordance with the carrier frequency method with novel means for changing the position of the grating with reference to the photostorage medium and/or vice versa, and with novel means for preventing accidental exposure of the medium to light during insertion or withdrawal of the medium from the housing of the camera.

The improved photographic apparatus comprises a housing for reception of a photostorage medium (preferably a sheet of photographic film mounted in a cassette or container which is insertable into a compartment provided therefor in the housing behind the picture taking lens), a grating rotatably mounted in the housing in front of the compartment for the photostorage medium, a release element mounted on the housing for movement between first and second positions to thereby initiate the exposure of the photostorage medium to light which passes through the grating, and indexing means for rotating the grating in response to each movement of the release element from the one to the other position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
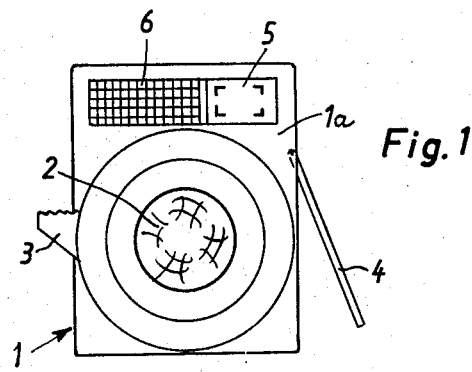
FIG. 1 is a schematic front elevational view of a photographic apparatus which embodies the invention, the door for the compartment which receives cassettes for photostorage medium being shown in partly open position.

FIG. 1 illustrates a still camera for modulated image or carrier frequency photography which is designed to make a plurality of exposures of a single photostorage medium 31 in accordance with the method which is disclosed, for example, in the aforementioned copending application Ser. No. 803,676.

The camera comprises a grating 22 having a high grating constant whose image is exposed onto the photostorage medium 31 in a plurality of different positions, namely, in a different angular position for each exposure. Thus, each exposure results in the making of an image of a subject or scene and of the grating 22 in a different angular position with reference to the photostorage medium 31. The images are superimposed upon each other. When the repeatedly exposed medium is withdrawn from the camera, it is subjected to a chemical treatment which includes bleaching to eliminate the developing silver. The image modulated onto each grating spectrum can be reproduced separately from all the others by arbitrary filtering of the spectra. The photostorage medium 31 can be exposed at least as many times as a conventional roll film for still photography, for example, between 25 and 50 times. Therefore, the housing 1 of the improved camera need not be provided with discrete chambers for supply and takeup reels or cartridges. A single cassette or container 21 for the photostorage medium 31 (hereinafter called film for short) can be inserted into a compartment 50 of the housing 1 behind the picture taking lens 2. Therefore, the housing 1 can be designed in such a way that its front wall 1a is of substantially square shape (see FIG. 1). This is made possible because the customary chambers for supply and takeup reels which flank the objective in conventional still cameras can be dispensed with.

The picture taking lens 2 is concentric with a first ring-shaped carrier 7 (FIG. 2) which is provided with a release element 3. The housing 1 is further provided with a pivotable door 4 (see FIGS. 1 and 3) which can be opened to permit insertion or removal of a cassette 21 from the compartment 50. The door 4 is pivotably mounted in a side wall 1b of the housing 1 and can be unlocked in response to rotation of a handgrip member 24 mounted on the rear wall 1c of the housing. The front wall 1a is further provided with a viewfinder window 5 and supports a photosensitive receiver 6 which forms part of the exposure control and is exposed to scene light.

Figure 2:
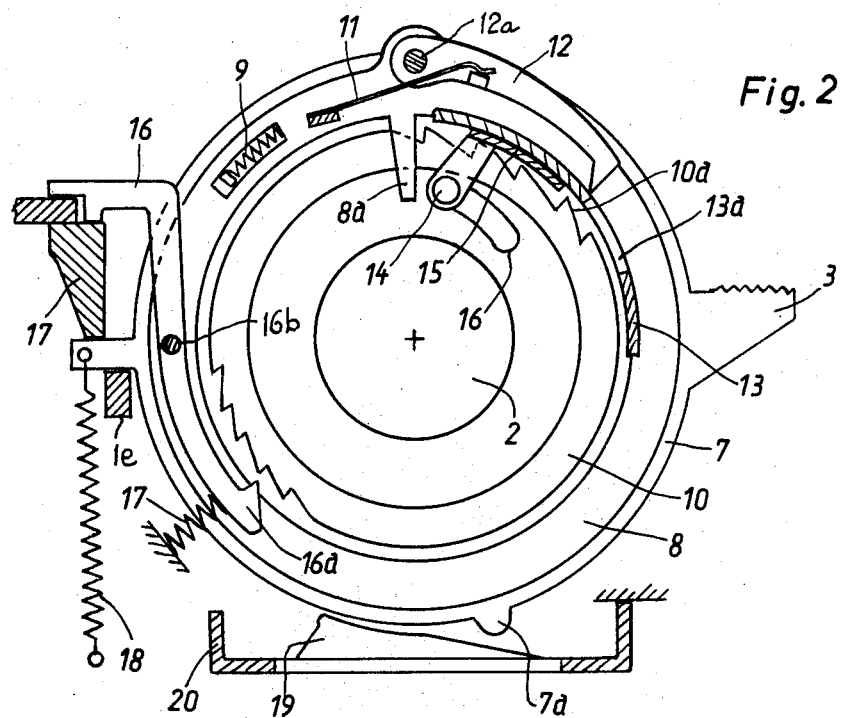
FIG. 2 is an enlarged fragmentary transverse vertical sectional view of the photographic apparatus, substantially as seen in the direction of arrows from the line II—II of FIG. 3.

FIG. 2 shows that the carrier ring 7 for the release element 3 is concentric with a second ring-shaped carrier 8 which is coupled thereto by a helical spring 9, and with a ring-shaped ratchet wheel 10 which supports the grating 22. The latter is located between the lens 2 and the film 31 in the properly inserted cassette 21. The ring 8 carries a motion transmitting pawl 12 which is pivotable on a pin 12a and is biased in a clockwise direction, as viewed in FIG. 2 by a leaf spring 11.

The pallet of the pawl 12 is slidable along an arcuate guide 13 which is fixedly mounted in the housing 1 and has an aperture or window 13a. The length of the aperture 13a, as considered in the circumferential direction of the ring 8, is just sufficient to enable the pawl 12 to index the ratchet wheel 10 (and hence the grating 22) through a predetermined angle. Such indexing of the grating 22 through a predetermined distance precedes each exposure of the film 31. The pallet of the pawl 12 can engage the teeth 10a on the periphery of the ratchet wheel 10. The ring 8 has a projection or arm 8a which can displace a shutter cocking member 14 extending through an elongated slot 16 of the housing 1 and carrying an arcuate shield or closure 15 which extends across the aperture 13d of the guide 13 when the cocking member 14 is displaced in the direction indicated by the arrow and assumes its second or operative position (not shown).

The housing 1 further supports a pivotable blocking lever 16 which is mounted substantially diametrically opposite the release element 3 and is turnable on a pin 16b. A helical spring 117 biases the blocking lever 16 in a counterclockwise direction, as viewed in FIG. 2, so as to urge a pallet 16a on the lower arm of the lever 16 into engagement with adjacent teeth 10a of the ratchet wheel 10.

The pallet 16a serves to prevent rotation of the ratchet wheel 10 in a counterclockwise direction. A combined arresting and disengaging slide 17 which is reciprocable in the housing 1 can be actuated at the will of the operator to disengage the pallet 16a from the teeth 10a as well as to prevent rotation of the ring 7 in response to application of finger pressure against the release element 3. The ring 7 is biased to a starting position (in which it abuts against a stop 1e of the housing 1) by a helical spring 18. Thus, the operator must overcome the bias of the spring 18 in order to make an exposure by moving the release element 3 in a clockwise direction at a time when the arresting slide 17 is held in a retracted position.

The ring 7 is further provided with a projection or lobe 7a which can engage a cam 19 provided on a bifurcated displacing lever 20 which is then pivoted to move a properly inserted cassette 21 in a direction toward the objective lens 2 so as to move the film 31 against the grating 22. The grating 22 is a disk-shaped body which is secured to a tubular extension 10b of the ratchet wheel 10 (see FIG. 3). This ratchet wheel is partially surrounded by a spring 23 which must be stressed in order to change the angular position of the grating 22 in response to actuation of the release element 3. The spring 23 biases the ratchet wheel 10 to a starting position. The parts 10, 12 constitute an indexing mechanism which rotates the grating 22 in a predetermined plane against the opposition of the spring 23 whenever the release element is moved from the end position shown in FIG. 2 to the other end position. The spring 23 returns the grating 23 to its starting position when the pallet 16a of the lever 16 is disengaged from the teeth 10a of the ratchet wheel 10.

Figure 4:
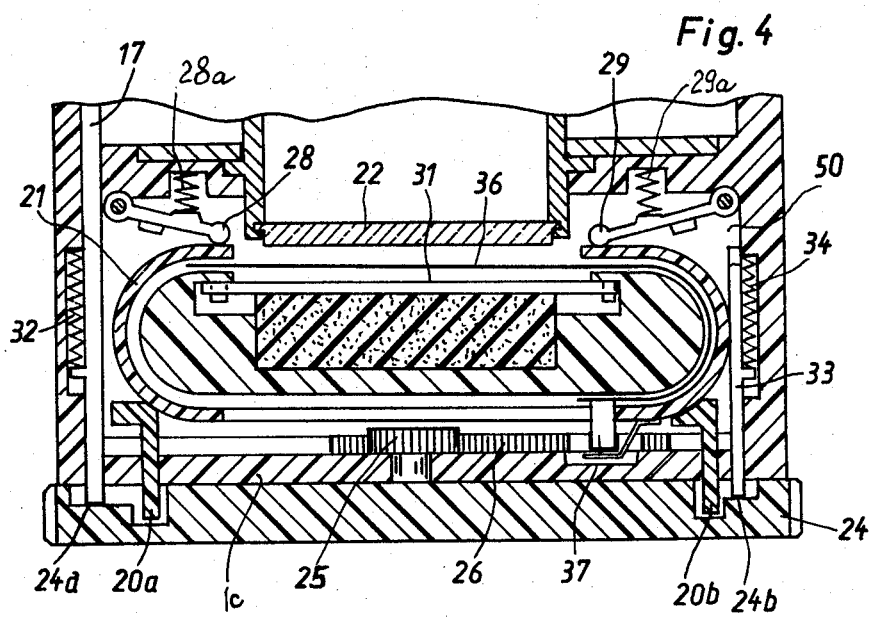
FIG. 4 is an enlarged view of a detail shown in FIG. 3, with the cassette for photostorage medium shown in section.
Figure 3:
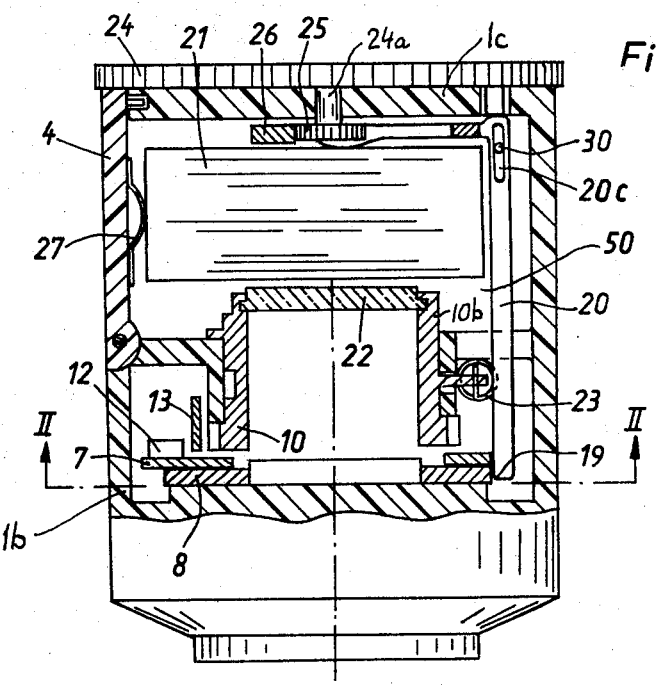
FIG. 3 is an enlarged plan view of the photographic apparatus, with certain parts shown in horizontal section.

FIGS. 3 and 4 illustrate the cassette 21 in inserted position (behind the grating 22). The aforementioned handgrip member 24 is a wheel having a serrated peripheral surface and mounted on a shaft 24a for a gear 25 which meshes with a rack 26 serving to move an opaque light-obstructing shade 36 of the cassette 21 away from a closed or light-obstructing position in front of the film 31. The handgrip member 24 can further actuate a locking bolt 33 for the door 4 at a time when the shade 36 is returned to closed position. The bolt 33 then permits opening of the door 4 preparatory to removal of the cassette 21 or insertion of a fresh cassette into the compartment 50. A leaf spring 27 (FIG. 3) which is mounted at the inner side of the door 4 and bears against the cassette 21 causes the door to open as soon as the locking bolt 33 is retracted to an inoperative position.

The cassette 21 is engaged by two locating levers 28, 29 which are biased by springs 28a, 29a. The purpose of the levers 28, 29 is to urge the cassette 21 away from the grating 22 and against the bifurcated lever 20 whose prongs or followers are shown at 20a, 20b and which is provided with an elongated slot 20c for a fixed guide pin 30. The lever 20 is reciprocable in parallelism with the optical axis of the lens 2. The prongs 20a, 20b extend outwardly through the rear wall 1c of the housing 1 and track suitably configurated cam faces of the handgrip member 24. The openings for the prongs 20a, 20b are provided with means (not shown) which prevent entry of light into the housing 1. When the handgrip member 24 is moved to a position in which the bolt 33 locks the door 4 in closed position and the shade 36 is moved to open or light-admitting position, the cam faces of the member 24 press the prongs 20a, 20b against the cassette 21 so that the film 31 is moved into immediate or close proximity of the grating 22. The cassette 21 then causes the levers 28, 29 to stress the springs 28a, 29a. The forward movement of the lever 20 is guided by the fixed pin 30. When the release element 3 is caused to rotate the ring 7, the projection 7a causes the cam 19 to move the lever 20 forwardly whereby the prongs 20a, 20b cause the film 31 to bear against the grating 20 while the camera makes an exposure.

The arresting slide 17 for the ring 7 is biased by a spring 32 so that it bears against a cam face 24a of the handgrip member 24. When the pinion 25 on the member 24 causes the rack 26 to maintain the shade 36 in closed or light-obstructing position, the cam face 24a causes the arresting slide 17 to prevent actuation of the release element 3 and the pallet 16a of the blocking lever 16 is disengaged from the teeth 10a of the ratchet wheel 10. The locking bolt 33 is biased against a cam face 24b of the handgrip member 24 by a spring 34.

Figure 5:
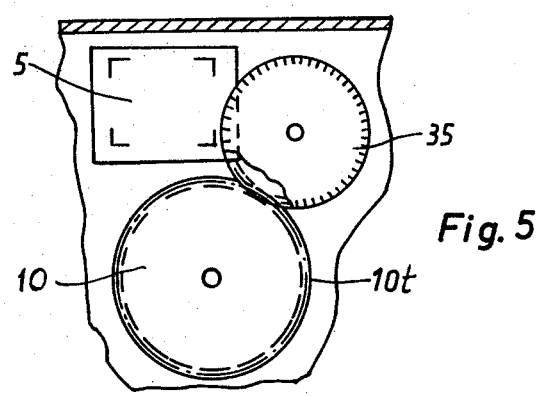
FIG. 5 is a fragmentary vertical sectional view of the photographic apparatus, showing a counter for the number of completed and/or available exposures.

FIG. 5 illustrates an exposure counter. The ratchet wheel 10 has an annulus of teeth 10t meshing with the teeth of a smaller gear 35 which is provided with numerals or other suitable indicia and a portion of which is observable by looking through the viewfinder window 5. The indicia on the visible portion of the gear 35 are movable with reference to an index (not shown) which pinpoints the number of completed exposures or the number of available exposures.

Figure 7:
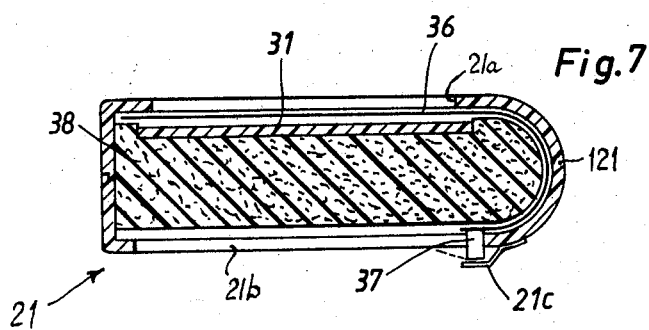
FIG. 7 is a sectional view of the cassette as seen in the direction of arrows from the line VII—VII of FIG. 6.
Figure 6:
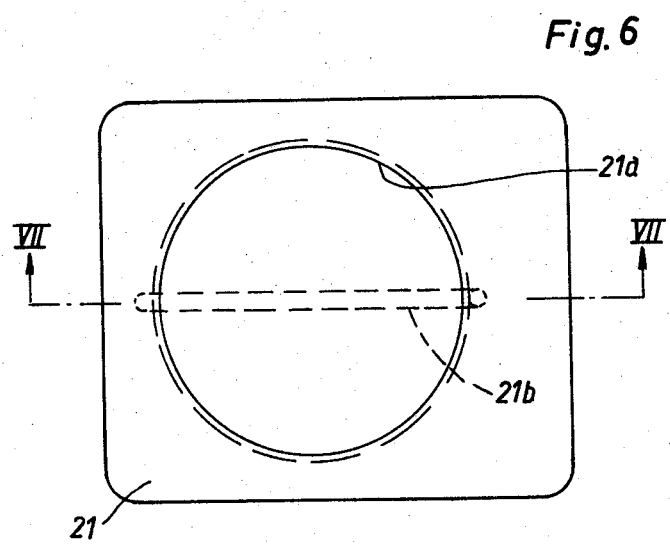
FIG. 6 is a rear elevational view of a cassette for photostorage medium which can be utilized in the apparatus of FIGS. 1–5.

FIGS. 6 and 7 illustrate the details of the cassette 21. The latter has a substantially brick-shaped casing 121 which consists of two substantially mirror symmetrical plastic sheels or walls joined by an integral hinge. One of the walls has a circular opening 21a whose diameter equals that of the grating 22. The aforementioned shade 36 is slidable in the casing 121 so as to move across or away from the opening 21a. This shade consists of flexible opaque material and is guided in an arcuate channel of the casing 121. A motion receiving projection or pin 37 of the shade 36 is reciprocable in a straight slot 21b in the other wall of the casing 121. When the shade 36 overlies the film 31, the pin 37 is concealed behind a guard 21c of the casing 121 to prevent unintentional exposure of the film 31 to light. The guard 21c can be replaced with suitable detent means for the pin 37. This guard also serves as a means for preventing improper insertion of cassette 21 into the compartment 50 of the housing 1.

The numeral 38 denotes an elastic cushion which fills the major part of the casing 121 and supports the film 31 behind the opening 21a. The cushion 38 preferably consists of foamed plastic and is preferably designed to impart to the exposed surface of the film 31 a convex shape so that, when the projection 7a of the ring 7 causes the lever 20 to press the film 31 against the grating 22, the central portion of the film 31 is first to engage the grating and the area of contact increases in a direction toward the marginal portions of the grating to thus insure that no air bubbles will be entrapped between the parts 22, 31 when the camera is about to make an exposure. The concave side of the film 31 faces the cushion 38.

The operation:

The handgrip portion 24 is moved to an angular position in which the cam face 20b causes the locking bolt 33 to release the door 4. The user then inserts into the compartment 50 a fresh cassette 21 in a predetermined position (determined by the guard 21c of the casing 121) while the shade 36 overlies the film 31 behind the opening 21a. The door is thereupon returned to closed position against the opposition of the spring 27 which bears against the casing 121 and the handgrip member 24 is rotated to return the locking bolt 33 to operative position. As the handgrip member 24 rotates, the pinion 25 moves the rack 26 which is provided with a pusher (not shown) serving to move the projection 37 along the slot 21b so that the shade 36 is moved away from the opening 21a in the front wall of the casing 121. Shortly before the handgrip member 24 reaches an end position, it causes the arms 20a, 20b of the lever 20 to push the cassette 21 forwardly so that the film 31 is moved into immediate proximity of the grating 22. The cam face 24a of the handgrip member 24 shifts the arresting slide 17 so that the latter releases the ring 7 and permits the pallet 16a of the blocking lever 16 to engage the adjacent teeth 10a of the ratchet wheel 10.

To make an exposure, the user presses the release element 3 in a clockwise direction, as viewed in FIG. 2 whereby the ring 7 entrains the ring 8 by way of the coupling spring 9. The ring 8 moves the pawl 12 whose pallet slides along the fixed guide 13 and enters the aperture 13a to engage the adjacent tooth 10a and to index the ratchet wheel 10 and the grating 22 through a predetermined angle. The pallet 16a rides over one of the adjacent teeth 10a and enters the adjacent tooth space to thus prevent anticlockwise rotation of the ratchet wheel 10 under the action of the spring 23.

As the ring 8 rotates in response to rotation of the ring 7, its arm 8a moves the cocking member 14 along the slot 16 whereby the member 14 cocks the shutter.

The shield 15 then overlies the aperture 13a to prevent repeated indexing of the grating 22 prior to the making of an exposure. The coupling spring 9 expands in response to further clockwise rotation of the ring 7 while the ring 8 remains at a standstill.

Shortly before the ring 7 causes the shutter to open, the projection 7a engages the cam 19 which causes the arms 20a, 20b of the lever 20 to press the film 31 against the grating 22. The film 31 remains in such position during the interval when the shutter is open. The shutter opens when the ring 7 reaches a predetermined angular position.

The user thereupon relaxes or terminates the pressure upon the release element 3 so that the spring 18 is free to contract and to rotate the ring 7 in a counterclockwise direction back to the position shown in FIG. 2. The projection 7a moves away from the cam 19 so that the springs 28a, 20a cause the locating levers 28, 29 to move the cassette 21 away from the grating 22. As the shutter opens, the cocking member 14 returns to the position shown in FIG. 2 and its shield 15 moves away from the aperture 13a. The camera is ready to make the next exposure.

The ratchet wheel 10 causes its gear teeth 10t to rotate the exposure counter gear 35 in response to each actuation of the release element 3. Thus, the user can look into the viewfinder window 5 to determine the number of completed exposures and/or the number of available exposures. When the last exposure is completed, the handgrip member 24 is rotated to its other end position whereby the springs 28a, 29a enable the levers 28, 29 to move the cassette 21 further away from the grating 22. The cam face 24a causes the arresting slide 17 to reassume the position shown in FIG. 2 so that the ring 7 is maintained in abutment with the stop 1e and the pallet 16a of the blocking lever 16 is disengaged from the teeth 10a of the ratchet wheel 10. The spring 23 is thereupon free to return the ratchet wheel 10 and the grating 22 to a starting position. The gear 25 on the shaft 24a of the handgrip member 24 causes the rack 26 to return the projection 27 to the position shown in FIG. 7 whereby the shade 36 overlies the film 31. Shortly before the handgrip member 24 reaches its end position, the cam face 24b causes the locking bolt 33 to release the door 4 which opens under the action of the spring 27 and permits withdrawal of the cassette 21 from the compartment 50.

The springs 28a, 29a and levers 28, 29 insure that the grating 22 is disengaged from and can rotate with reference to the film 31 while the pawl 12 rotates the ratchet wheel 10. The cam 19 is caused by the projection 7a to move the film 31 into face-to-face abutment with the grating 22 while the ring 7 rotates with reference to the ratchet wheel 10. This insures that the grating 22 does not rotate while it abuts against the front side of the film 31.

The improved camera is susceptible of many further modifications. For example, the ratchet and pawl mechanism 10, 10a, 12 can be replaced by other suitable indexing mechanism for the grating 22, such as a Geneva movement or a gear train. Furthermore, the cassette 21 can be replaced with other types of cassettes, for example, with a cassette wherein the shade 36 or an analogous light obstructing part is permanently biased to the light obstructing position. Also, the grating 22 can be mounted for movement toward and away from the film in the inserted cassette.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus for repeated exposure of a photostorage medium in accordance with the carrier frequency method, a combination comprising a housing for reception of a photostorage medium; a grating rotatably mounted in said housing; a release element mounted on said housing for movement between first and second positions to thereby initiate the exposure of a photostorage medium to light which passes through said grating; and indexing means for rotating said grating through a predetermined angle in response to each movement of said release element from one of said positions to the other position.

2. A combination as defined in claim 1, wherein said indexing means comprises a ratchet and pawl mechanism.

3. A combination as defined in claim 2, wherein said mechanism comprises a toothed ratchet wheel drivingly connected with said grating and a pawl operatively connected with said release element to rotate said ratchet wheel in response to movement of said release element from said one to said other position.

4. A combination as defined in claim 3, further comprising guide means for controlling the extent of angular displacement of said ratchet wheel in response to movement of said pawl while said release element moves from said one to said other position.

5. A combination as defined in claim 4, wherein said ratchet wheel comprises an annulus of teeth and said pawl comprises a pallet which is biased into engagement with said teeth, said guide means being disposed between said pawl and said annulus and having an aperture through which said pallet extends while moving in response to movement of said release element to thereby index the ratchet wheel to the extent determined by the dimensions of said aperture.

6. A combination as defined in claim 3, further comprising a first rotary carrier for said release element, a second rotary carrier for said pawl, and elastic coupling means connecting said carriers so that said first carrier rotates said second carrier in response to movement of said release element from said one to said other position.

7. A combination as defined in claim 3, further comprising guide means for controlling the extent of angular displacement of said ratchet wheel in response to movement of said pawl while said release element moves from said one to said other position, said guide means having an aperture through which said pawl extends while engaging said ratchet wheel, and further comprising shutter cocking means and means for moving said cocking means from an inoperative to an operative position in response to movement of said release element from said one toward said other position, said cocking means comprising a closure which overlies said aperture in the operative position of said cocking means to thus prevent engagement between said pawl and said ratchet wheel.

8. A combination as defined in claim 1, wherein said indexing means is arranged to rotate said grating from a starting position in a first direction and further comprising biasing means for biasing said grating in a second direction counter to said first direction, blocking means for normally holding said grating against rotation in said second direction, and disengaging means for disengaging said blocking means from said grating at the will of the operator so that the grating is released for return movement to said starting position under the action of said biasing means.

9. A combination as defined in claim 1, further comprising a container for a photostorage medium, said container being removably installed in a compartment provided therefor in said housing so as to maintain the medium in a position adjacent to said grating, and means for maintaining said grating out of contact with the medium in said container while said grating is rotated by said indexing means.

10. A combination as defined in claim 9, wherein said grating is rotatable in a predetermined plane and further comprising displacing means for placing said grating into face-to-face abutment with the medium in said container not later than upon completion of movement of said release element to said other position.

11. A combination as defined in claim 10, wherein said indexing means is arranged to rotate said grating in said plane during a first stage of movement of said release element from said one to said other position and said displacing means is arranged to place said grating into face-to-face abutment with the medium in said container in response to the next-following stage of movement of said release element to said other position.

12. A combination as defined in claim 1, further comprising exposure counter means including an indicia bearing portion which is observable from without said housing and receives motion from said indexing means.

13. A combination as defined in claim 12, wherein said indexing means comprises a first rotary gear and said indicia bearing portion comprises a second gear which meshes with and is rotated by said first gear in response to indexing of said grating, and further comprising viewfinder means including a window provided in said housing, said indicia bearing portion being observable by looking into said window.

14. A combination as defined in claim 1, wherein said housing defines a compartment adjacent to and located behind said grating, as considered in the direction of entry of light, said housing having a door movable between open and closed positions to respectively afford and prevent access to said compartment, and further comprising a container for photostorage medium, said container being removably received in said compartment so that the photostorage medium therein faces said grating.

15. A combination as defined in claim 14, wherein said container comprises an opaque shade movable to and from a light-obstructing position between said grating and the photostorage medium in said container, displacing means for moving said shade to and from said light-obstructing position, locking means operative to lock and unlock said door in closed position, and control means for maintaining said locking means in locking position when said shade is out of said light-obstructing position.

16. A combination as defined in claim 15, wherein said shade comprises a projection and said displacing means comprises a rotary pinion and a rack meshing with said pinion and arranged to move said shade to and from said light-obstructing position by way of said projection in response to rotation of said pinion in opposite directions.

17. A combination a defined in claim 15, wherein said control means comprises a handgrip member located without said housing and drivingly connected to said displacing means, said handgrip member being movable between a first position in which said locking means locks said door in closed position and said shade is out of said light-obstructing position and a second position in which said locking means unlocks said door and said shade assumes said light-obstructing position.

18. A combination as defined in claim 17, further comprising means for reducing the distance between said container and said grating in response to movement of said handgrip member to said first position.

19. A combination as defined in claim 17, wherein said indexing means comprises a ratchet wheel operatively connected with said grating and a pawl operatively connected with said release element to turn the ratchet wheel in a first direction in response to movement of said release element to said other position, and further comprising means for biasing said ratchet wheel in a second direction counter to said first direction, blocking means for normally holding said ratchet wheel against rotation in said second direction, and means for disengaging said blocking means from said ratchet wheel in response to movement of said handgrip member to said second position thereof.

* * * * *